US007944533B2

(12) United States Patent
Masaru et al.

(10) Patent No.: US 7,944,533 B2
(45) Date of Patent: May 17, 2011

(54) MULTI-DOMAIN LIQUID CRYSTAL DISPLAY

(75) Inventors: Yasui Masaru, Chunan (TW);
Masahide Inoue, ChuNan (TW);
Minoru Shibazaki, ChuNan (TW)

(73) Assignee: Chimei Innolux Corporation, Miao-Li County (TW)

( * ) Notice: Subject to any disclaimer, the term of this patent is extended or adjusted under 35 U.S.C. 154(b) by 37 days.

(21) Appl. No.: 12/026,167

(22) Filed: Feb. 5, 2008

(65) Prior Publication Data
US 2009/0079924 A1    Mar. 26, 2009

(30) Foreign Application Priority Data
Feb. 20, 2007   (JP) ................................. 2007-039408

(51) Int. Cl.
*G02F 1/1339*   (2006.01)
(52) U.S. Cl. ........................................................ 349/129
(58) Field of Classification Search .................... 349/129
See application file for complete search history.

(56) References Cited

U.S. PATENT DOCUMENTS
2001/0024257 A1 *   9/2001  Kubo et al. .................... 349/138

FOREIGN PATENT DOCUMENTS
JP    06301036    10/1994
JP    2003167253    6/2003
* cited by examiner

*Primary Examiner* — David Nelms
*Assistant Examiner* — Phu Vu
(74) *Attorney, Agent, or Firm* — Tim Tingkang Xia; Morris, Manning & Martin, LLP

(57) ABSTRACT

The present invention achieves the multi-domain configuration by providing an insulation film region at least one location in each pixel on one substrate of a pair of substrates of an active matrix multi-domain vertically aligned liquid crystal display for differentiating electrical potential to be applied to a certain zone of the liquid crystal from that to the liquid crystal at the other area when a voltage is applied to the liquid crystal, thereby causing different electrical potential gradients in at least two directions.

10 Claims, 5 Drawing Sheets

B-B' Cross Section

MULTI-DOMAIN LIQUID CRYSTAL DISPLAY

BACKGROUND OF THE INVENTION

1. Field of the Invention

The present invention relates to a multi-domain liquid crystal display, more specifically to a multi-domain liquid crystal display with high contrast ratio and quick response.

2. Description of the Related Art

A liquid crystal display device is currently used as a flat panel display that provides images comparable to a CRT (Cathode Ray tube) in a personal computer (PC), a television (TV) receiver, a display screen for cellular phone, various OA (Office Automation) equipments and the like. Further growth of the liquid crystal display is anticipated.

Generally, a liquid crystal display device comprises a pair of substrates having liquid crystal filled in the gap between the substrates and adjusts the amount of light that is transmitted through the liquid crystal in response to the electric field applied thereto. A vertically aligned (VA) twisted-nematic type of the liquid crystal display device comprises a pair of transparent substrates having a transparent electrode on the inner surfaces and polarizing plates on the outer surfaces. A liquid crystal material having negative dielectric anisotropic property is filled in the gap between the pair of transparent substrates. When a voltage is applied between the electrodes, an electric field is developed in the vertical direction to the substrates, thereby causing longer axes of the liquid crystal molecules to slant in the direction perpendicular to the electric field and twisting asymmetric molecules of the liquid crystal in a spiral manner at a constant pitch.

Since liquid crystal molecules near an alignment film are substantially perpendicular even if no voltage is applied, display quality of a VA type liquid crystal display is significantly better than that of an TN (Twisted-Nematic) type liquid crystal display in contrast and viewing angle characteristic. However, it has disadvantages of degrading contrast when the screen is viewed at an off-angle and narrower viewing angle performance due to inversed display or the like. A multi-domain technology has been developed to improve such disadvantages of the VA type liquid crystal display, in which alignment of liquid crystal molecules is divided into plural different orientations within a pixel.

In the multi-domain technology, longer axes of liquid crystal molecules that are vertically aligned in case of no voltage application tend to fall when a voltage is applied. However, falling directions of liquid crystal molecules are random and thus not regulated, thereby making it difficult to perform a uniform optical characteristic and exhibiting a slow response characteristic. Various attempts have been made to improve response time by regulating the moving direction of liquid crystal molecules at an early stage of voltage application. For example, in the Patent Document 1 as listed hereunder, protrusions (or projections) having sloped side surfaces are formed in respective pixel areas, thereby achieving a multi-domain configuration by utilizing the phenomenon that liquid crystal molecules fall under the influence of the sloped surfaces of the protrusions when a voltage is applied to the liquid crystal layer. On the other hand, it is proposed in the Patent Document 2 as listed hereunder to form an opening at the interfacing portion at the center of each pixel electrode in the opposed electrodes, thereby developing a portion of sloped electric field at the center portion of each pixel. As a result, alignment of each liquid crystal molecule is split into two or four orientations.

However, in the method of providing the protrusions, liquid crystal molecules near the protrusions are sloped even in case of applying no voltage to such pixel electrode, thereby reducing contrast due to light leakage under the intrinsically black condition of the display screen. It also reduces the response time because of gradual slope of liquid crystal molecules near the protrusion when a voltage potential is applied. Moreover, there causes variations in the way of falling liquid crystal molecules unless otherwise precisely controlling the width, height, and slope angle of each protrusion, thereby resulting in non-uniformity in the half-tone zone and making the fabrication process expensive. On the other hand, in the method of forming the opening in each pixel electrode, since no voltage is applied to the areas where no electrodes are formed, response times of the liquid crystal become slow in display transitions from black to half-ton or from white to half-tone, thereby increasing driving voltage and power consumption.

[Patent Document 1] Japanese patent publication no. 2003-167253

[Patent Document 2] Japanese patent publication no. 6-301036

SUMMARY OF THE INVENTION

In order to solve the aforementioned problems associated with multi-domain liquid crystal display, the present invention provides a higher contrast, higher response speed, lower power consumption and wider viewing angle liquid crystal display device by achieving multi-domain configuration without forming protrusions or openings in the electrode.

In an active matrix type multi-domain vertically aligned liquid crystal display, the present invention provides an insulation film region in a certain area within each pixel on the substrate for causing electrical potential gradients in at least two directions when a voltage is applied to the liquid crystal, thereby achieving the multi-domain configuration without forming any protrusions or openings. The insulation film region forms a kind of a capacitance in series with the liquid crystal layer. For example, when the voltage across the insulation film region is increased, the voltage across the liquid crystal layer immediately above the insulation film region is decreased and the voltage to be applied to the liquid crystal layer other than the insulation film region is decreased accordingly, thereby causing electrical potential gradients. By utilizing such electrical potential gradients, the present invention achieves the multi-domain configuration.

A first preferred type of the basic configuration of the present invention is forming an insulation film and an insulation film region comprising a secondary pixel electrode (a metal island) formed on the insulation film on a certain area at least one location within each pixel of one of a pair of substrates each having a transparent pixel electrode on the inner surface thereof, wherein dielectric constant of the insulation film is either sufficiently higher or lower than that of liquid crystal molecules.

By choosing the material of the insulation film to have significantly lower or higher dielectric constant than that of liquid crystal molecules, the first embodiment of the present invention is able to control the electrical potential to be applied to the insulation film region and form potential gradients by setting the voltage to be applied to the liquid crystal layer immediately above the insulation film region relatively lower or higher than the voltage to be applied to the liquid crystal layer at locations other than the insulation film region.

Now, second, third and fourth preferred types of the present invention do not employ any materials for the insulation film that has significantly higher or lower dielectric constant than that of liquid crystal molecules unlike the abovementioned first embodiment. However, improvements are made in configuration of the insulation film region so as to achieve the similar advantages to the first embodiment that uses the material of the insulation film having significantly higher or lower dielectric constant.

The second preferred type of the present invention features in the insulation film region that causes electrical potential gradients in at least two directions by forming an aperture in each primary pixel electrode on the substrate opposed to a color filter, an insulation film that covers the aperture and a part of the primary pixel area adjacent to both end portions of the aperture, and a secondary pixel electrode (a metal island) on the insulation film to have the same width as the insulation film, thereby making the secondary pixel electrode (the metal electrode) that is electrically floating from the primary pixel electrode by way of the insulation film. By employing this particular configuration, when a voltage is applied to the liquid crystal layer, electrical potential gradients develop in the peripheral areas of the insulation film region similar to the first embodiment of the present invention.

The third preferred type of the present invention features in the insulation film region that causes electrical potential gradients in at least two directions by forming a secondary pixel electrode (a second metal island) on the substrate opposed to a color filter, and an insulation film that covers the secondary pixel electrode (a second metal island) and the substrate, wherein the primary pixel electrode is split into a first metal island at the location immediately above substantially the center of the secondary pixel electrode by way of two insulation films and other primary pixel electrode at the location above the secondary pixel electrode (the second metal island).

The fourth preferred type of the present invention features in forming an aperture having the width E in the pixel electrode on the substrate that is opposed to the color filter, wherein the aperture and both end portions of the pixel adjacent to the aperture are covered with an insulation film.

The insulation films used in the second, third and fourth preferred type of the present invention may be formed using the same material and the same lithographic method as the insulation film in fabricating thin film transistors (TFTs) on the substrate, thereby enabling to avoid cost increase due to complicated fabrication process. Dielectric constant of the insulation film that is used herein is chosen to be equal to or lower than that of liquid crystal molecules. Preferable materials for the insulation film include silicon dioxide and silicon nitride.

According to the formation of the insulation film region of the present invention, it is possible to provide high contrast, high response speed, low power consumption and wider viewing angle liquid crystal display device, because the multi-domain configuration can be realized due to differences in electrical potential gradients without forming protrusions or openings in the electrode.

DETAILED DESCRIPTION OF THE PREFERRED EMBODIMENTS

Although the present invention will be described in considerable detail with reference to certain preferred embodiments thereof, however prior to this description, it is should be understood that those skilled in the art can easily make changes to the present invention described herein and the same performance as the present invention is obtained. Therefore, it is to be understood that the following description is a general disclosure to those skilled in the art and is not restrictive of the present invention.

Now, the operation principle of the embodiments of the present invention will be described in detail with reference to the accompanying drawings.

Figure 1:
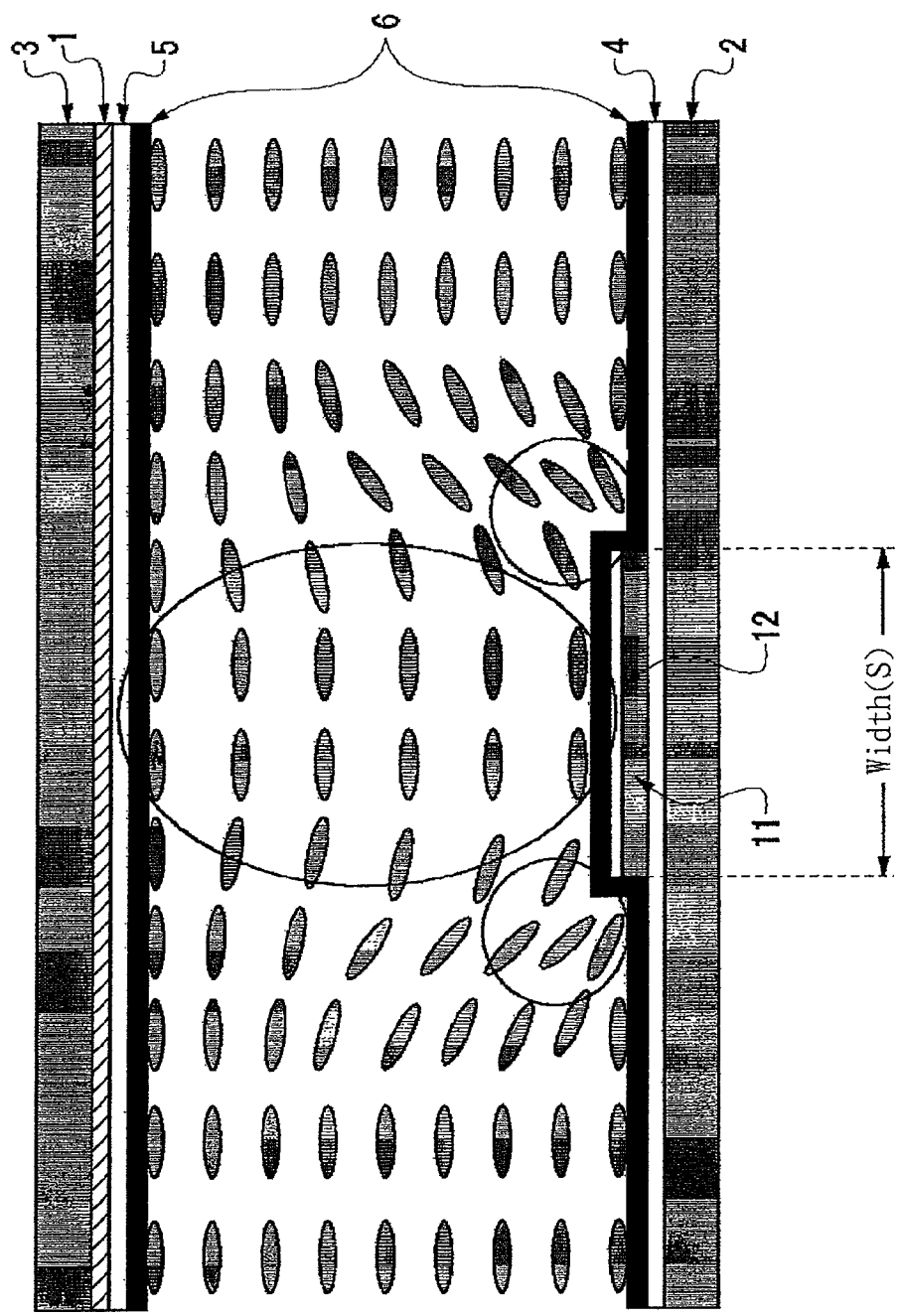
FIG. 1 is a cross section view illustrating the configuration of the insulation film region in a first embodiment of the present invention.

FIG. 1 is a cross section view illustrating the configuration of the insulation film region in a first embodiment of the present invention. It comprises glass substrates 2 and 3. A color filter 1, a pixel electrode 5 and an alignment film 6 are sequentially laminated on the inner surface of the glass substrate 3. A primary pixel electrode 4 is disposed on the inner surface of the substrate 2 that is opposed to the color filter 1. An insulation film 11 having the width S is formed on the primary pixel electrode 4 at a predetermined region within a pixel and a secondary pixel electrode (a metal island) 12 is also formed on the insulation film 11. It is assumed here that dielectric constant $\in_i$ of the insulation film is significantly lower than dielectric constant $\in_c$ of liquid crystal molecules. Then, capacitance $C_i$ formed at the insulation film region is as follows:

$$C_i = \in_i \cdot S_c(S)/d_i$$

(Wherein, $S_c(S)$ is the area of the secondary pixel electrode that is a function of the width S and $d_i$ is the thickness of the insulation film.) If there is no such insulation film and the secondary pixel electrode directly on the insulation film and normally filled with a liquid crystal material, it can be assumed that the same electrode as the secondary pixel electrode is virtually floating at the location of the secondary pixel electrode. A partial capacitance Cc of the liquid crystal film at the virtual portion is as follows:

$$C_c = \in_c \cdot S_c(S)/d_i$$

Since capacitances $C_i$ and $C_c$ are considered to be in series between pixel electrodes, voltages to be applied across series connected capacitors are inversely proportional to their capacitances. If dielectric constant $\in_i$ of the insulation film and dielectric constant $\in_c$ of the liquid crystal are significantly different, $C_i$ is significantly different from the capacitance $C_c$ of the liquid crystal layer. Accordingly, when a voltage V is applied between the pixel electrodes, voltage Vc that is applied across the liquid crystal layer immediately above the insulation film is equal to V minus the voltage Vi across the insulation film region, i.e., V-Vi. If Vi decreases, V-Vi approaches to V that is the voltage applied across the liquid crystal layer at other regions despite the fact that the thickness of the liquid crystal layer at the insulation film region is thinner than the liquid crystal layer at the other regions. On the other hand, if Vi increases, the voltage at the insulation film region becomes lower as compared to the voltage across the liquid crystal layer at other regions and at a higher rate than the rate of decreasing the thickness of the liquid crystal layer even if the thickness of the liquid crystal layer immediately above the insulation film is relatively thin. As a result, there causes a difference between the voltage Vc across the liquid crystal layer immediately above the insulation film and the voltage V across the liquid crystal layer at other regions, thereby developing electrical potential gradations at the periphery of the insulation film region. The present invention utilizes the electrical potential gradations that are developed in the above manner for differentiating the orientations of liquid crystal molecules near the insulation film, thereby achieving the multi-domain configuration.

Although FIG. 1 shows an example of alignment orientation of liquid crystal molecules when sufficient voltage is applied to the pixel, almost all of liquid crystal molecules are parallel to the substrate, i.e., liquid crystal molecules are not slanted at the entire area of the insulation film region and regions where liquid crystal molecules are slanted are limited to the periphery of the insulation film region as illustrated in FIG. 1. The uniqueness in alignment of molecules only at the periphery of the insulation film region appears at the point when all liquid crystal molecules start to slant by applying a slight voltage from the condition when no voltage is applied and all molecules are standing up vertically. In this manner, orientation of slanting liquid crystal molecules is initially regulated for improving the switching speed (response speed). In the condition when no voltage is applied, there is no slanting of liquid crystal molecules under influence of protrusions or the like, thereby improving contrast. Moreover, since there are no discontinuities in the electrode, there is essentially no increase in power consumption. Additionally, by properly choosing dielectric constant $\in_1$, thickness $d_1$ and area S of the insulation film, it is possible to optimize electrical potential gradients at the periphery of the insulation film region.

Figure 2:
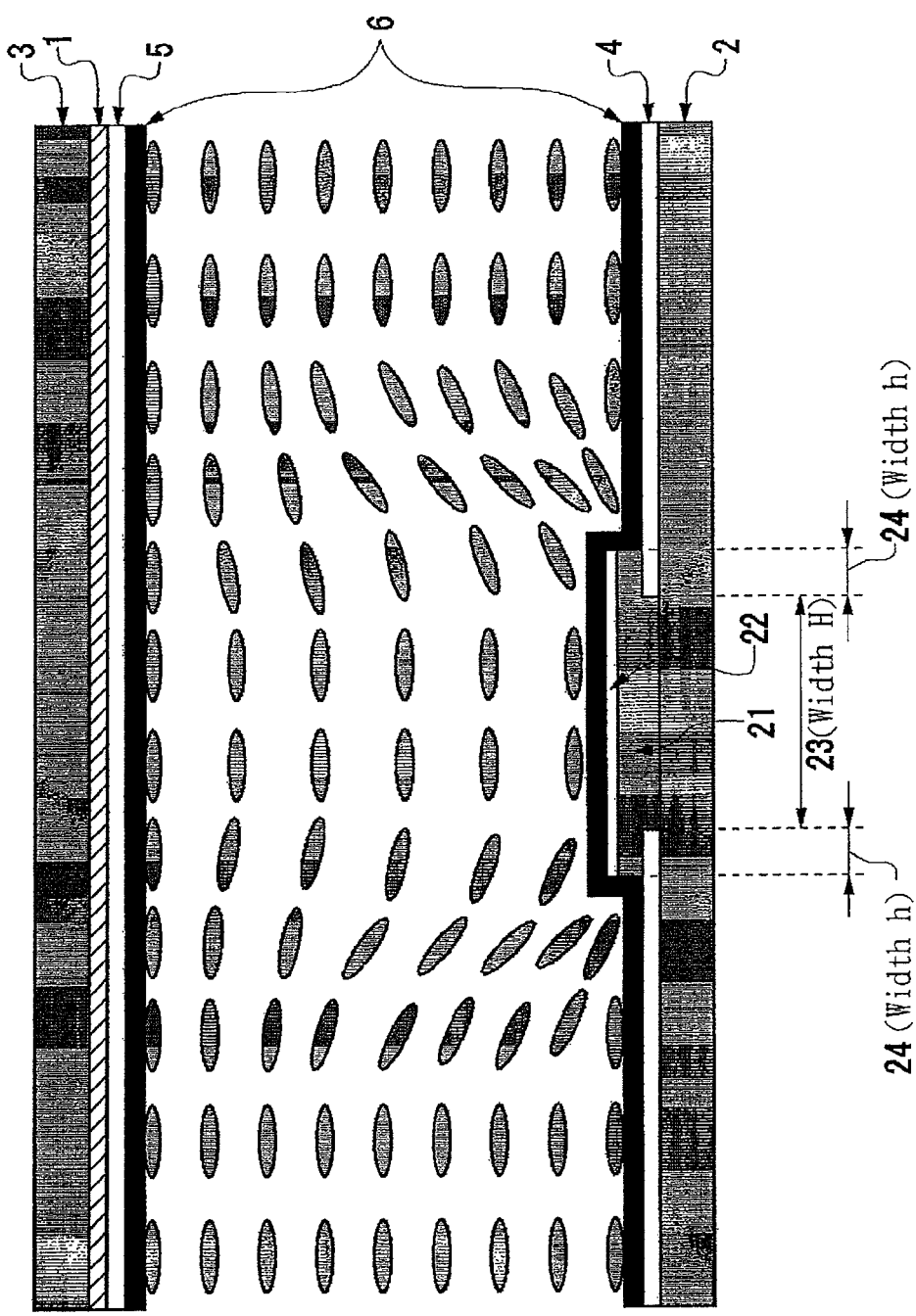
FIG. 2 is a cross section view illustrating the configuration of the insulation film region in a second embodiment of the present invention.

FIG. 2 is a cross section view illustrating the configuration of the insulation film region in a second embodiment of the present invention. It comprises glass substrates 2 and 3, wherein a color filter 1, a pixel electrode 5 and alignment film 6 are sequentially laminated on the inner surface of the glass substrate 3. On the inner surface of the substrate 2 that is opposed to the color filter 1, there is provided a primary pixel electrode 4 formed with an aperture 23 having the width H in a certain zone within the pixel. An insulation film 21 having the width H+2h is also formed to cover the aperture 23 and adjacent both ends or edge portions 24 (width: h) of the primary pixel electrode. It is to be noted that there are portions 24 (width h) where the primary pixel electrode 4 and the secondary pixel electrode 22 oppose to each other. The secondary pixel electrode (the metal island) 22 is electrically floating with respect to the primary pixel electrode 4 by way of the insulation film 21.

By employing such particular configuration, electrical potential gradients are created at the peripheral area of the insulation film region because of differences in voltages to be applied to the liquid crystal area immediately above the metal island 22 and the liquid crystal at the other area, thereby achieving the multi-domain configuration of different orientations of liquid crystal molecules. It is to be noted that the electrical potential gradients at the periphery of the insulation film region can be optimized by choosing the ratio in areas of the overlapping portions 24 (width: h) between the primary pixel electrode 4 and the metal island 22 and the aperture 23 (width: H) where the primary pixel electrode lacks and dielectric constant of the insulation film.

At this time, as shown in FIG. 2, when a voltage is applied, liquid crystal molecules immediately above the insulation film region are parallel with the substrate and do not slant over the entire area of the insulation film region. This enhances the switching speed (response speed) because slanting zones of liquid crystal molecules are limited only to the periphery of the insulation film region. On the other hand, when no voltage is applied, contrast can be improved because there is no slanting of liquid crystal molecules due to protrusions or the like. Moreover, power consumption is relatively low because of no discontinuities in electrode.

Figure 3:
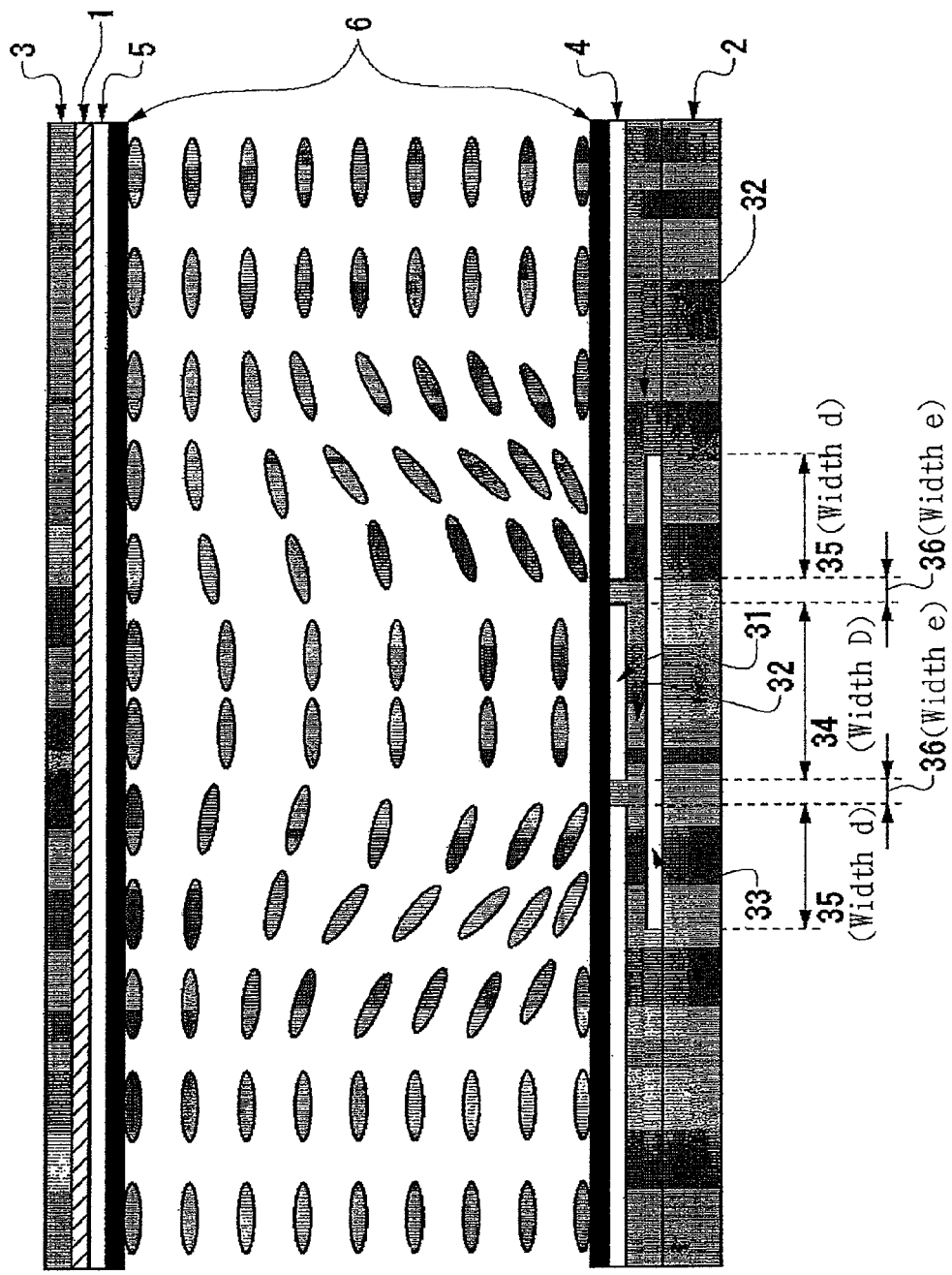
FIG. 3 is a cross section view illustrating the configuration of the insulation film region in a third embodiment of the present invention.

FIG. 3 is a cross section view illustrating the configuration of the insulation film region in a third embodiment of the present invention. It comprises a pair of glass substrates 2 and 3 as well as a color filter 1, a pixel electrode 5 and an alignment film 16 laminated sequentially on the inner surface of the glass substrate 3. A secondary pixel electrode (a secondary metal island) 33 having the width D+2d+2e is formed on the substrate 2 that is opposed to the color filter 1. An insulation film 32 is formed to cover the secondary pixel electrode (the secondary metal island) 33 and the substrate 2. A primary pixel electrode 4 is formed on the insulation film 32. The primary pixel electrode 4 is divided into a first metal island 31 having the width D and the remaining primary pixel electrode 4 at the upper portion of the secondary pixel electrode (the secondary metal island) 33.

By employing such particular configuration, there causes differences in electric field distribution at the liquid crystal zone above the metal island 31 and the other area, i.e, the liquid crystal zone on the electrode 4, thereby developing electrical potential gradients at the periphery of the metal island 31 when a voltage is applied, thereby achieving the multi-domain configuration. By properly choosing the ratio in area of the overlapped portion 35 (width: d) of the primary pixel electrode 4 and the metal island 33 and the width of first metal island 34 (width: D) where there is no primary pixel electrode as well as dielectric constant of the insulation film 32, the above-mentioned gap in capacitance is adjusted for optimizing the electrical potential gradients at the periphery of the insulation film region.

When a voltage is applied under this condition, liquid crystal molecules immediately above the primary metal island are parallel and do not slant over the entire area of the insulation film region and the area in which liquid crystal molecules are slanted is limited only to the periphery of the primary pixel island as shown in FIG. 3. Such uniqueness in orientation of molecules only in the periphery of the insulation film is seen at the time when all liquid crystal molecules start to slant by applying slight voltage from the vertical orientation of all molecules when no voltage is applied. Thus, the slanting orientation of liquid crystal molecules is initially restricted and improving the switching speed (response speed). Moreover, contract can be enhanced because of the fact that there is no slanting of liquid crystal molecules due to protrusions or the like when no voltage is applied. Power consumption does not increase because there is no lacking portion of the electrode.

Figure 4:
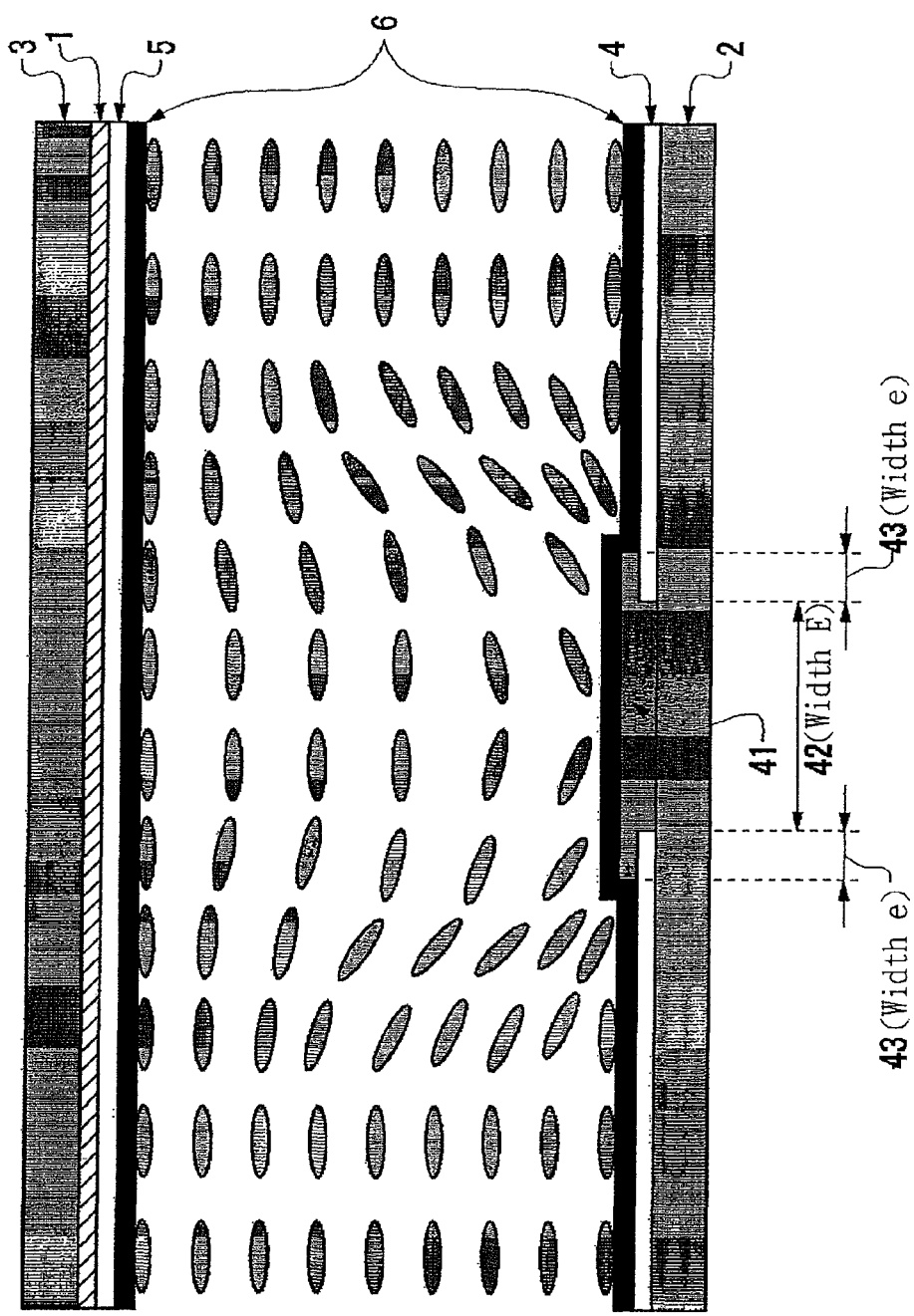
FIG. 4 is a cross section view illustrating the configuration of the insulation film region in a fourth embodiment of the present invention.

FIG. 4 is a cross section view illustrating the configuration of the insulation film region in a fourth embodiment of the present invention. It comprises an aperture 42 having the width E in a pixel electrode 4 on a substrate 2 opposed to a color filter 1. It also comprises an insulation film 41 having the width E+2e that covers the aperture 42 in the pixel electrode 4 and both end portions 43 of the pixel electrode adjacent to the aperture.

By employing such unique configuration, there causes gaps in electrical potentials on the liquid crystal zone above the aperture 42, the liquid crystal area above an overlapping portion 43 of the primary pixel electrode 4 and the insulation film 41, and the liquid crystal at the other primary pixel portion. This causes electrical potential gradients at the periphery of the insulation film region when a voltage is applied, and thus achieving the multi-domain configuration. The electrical potential gradients at the periphery of the insulation film region can be optimized by properly choosing the ratio in area of the aperture 42 (width: E) and the overlapping portion of the primary pixel electrode 4 and the insulation film 41 as well as dielectric constant of the insulation film 41.

Figure 5:
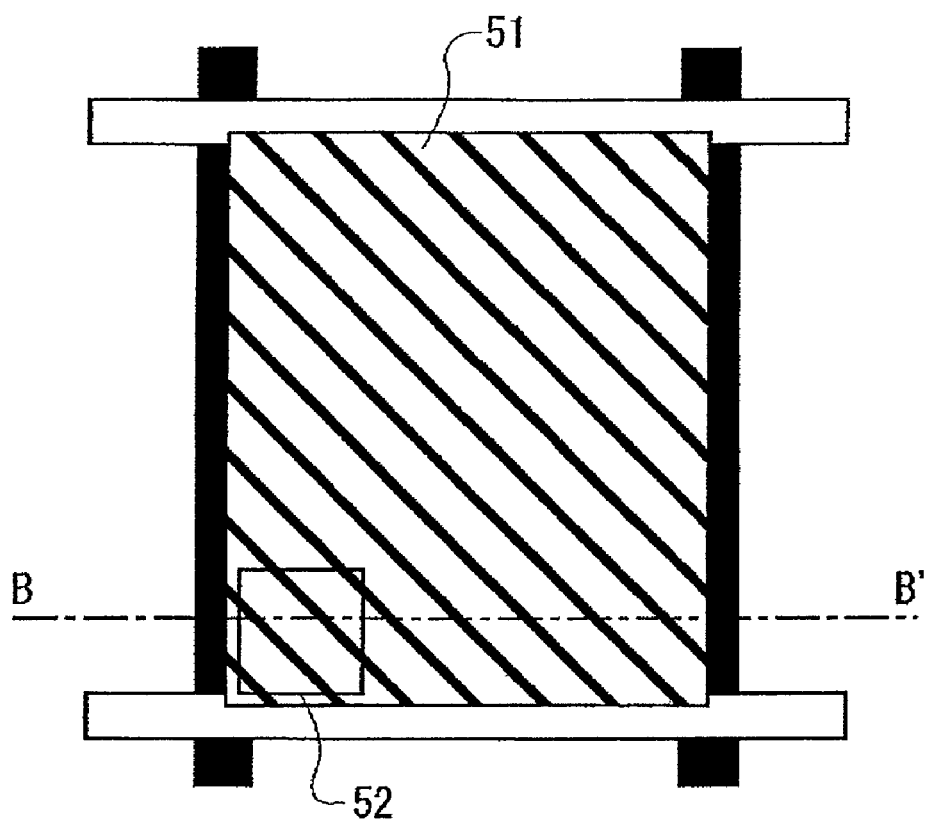
FIG. 5 illustrates a TFT and its peripheral pixel configuration.
Figure 5:
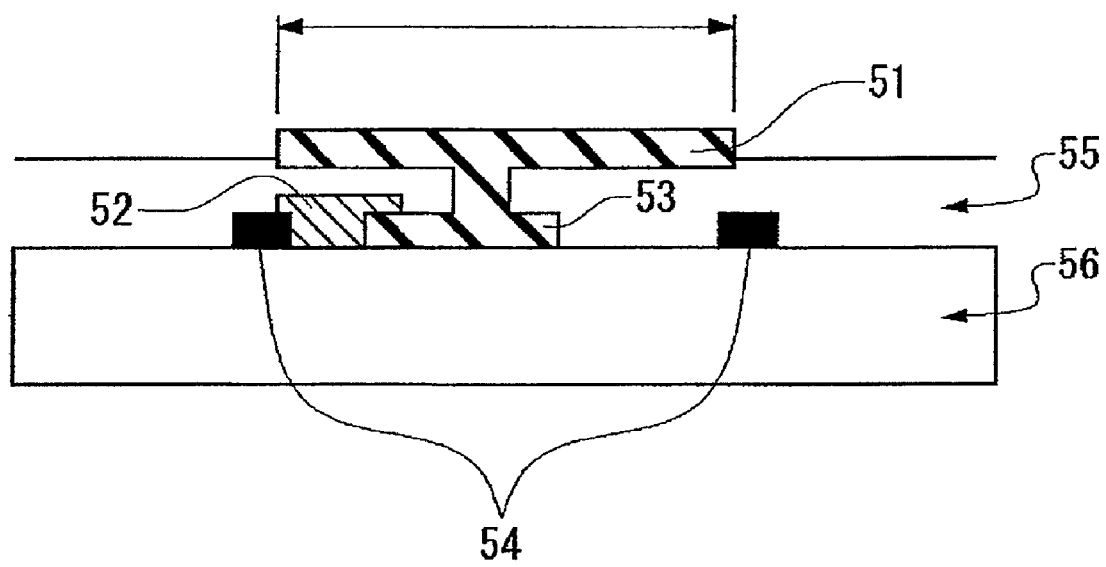

Materials to be used in the present invention as the primary pixel electrode and the secondary pixel electrode (the metal island) are any metals having light reflective characteristic and preferably the same metallic material as used in TFTs. For example, a TFT and its peripheral pixel configuration are shown in FIG. 5. FIG. 5 illustrates a TFT and a pixel electrode in the periphery of the TFT in which the gate electrode is eliminated. It shows a partial configuration of a liquid crystal pixel in a general wide aperture rate specification, which is a multilayer configuration having a drain electrode 53 in the lower layer and a pixel electrode 51 in the upper layer. In case of a general pixel having multi-layered metal films as shown in this particular example, it is also possible to realize the present invention by utilizing either one of the multi-layered metal films, the insulation films in the gaps between the metal films and the like. Shown is an example of the third embodiment as shown in FIG. 3 and the relationship between the electrodes of the pixel configuration in FIG. 5. The secondary pixel electrode 33 in FIG. 3 corresponds to the layer position of the drain electrode 53 in FIG. 5 and is made from the same material as used therefor. The primary pixel electrode 4 and the first metal island 31 in FIG. 3 correspond to the layer position of the pixel electrode 51 in FIG. 5 and are made from the same material as used therefor. Furthermore, as the insulation films between the multi-layered metals, the insulation material in FIG. 3 and the insulation layer 55 in FIG. 5 are the same layers and the same materials. Similar correspondence can be made in the layer configuration, the metal films and the materials of the insulation films of the first and second embodiments. Such correspondence applies even if the TFTs are the bottom gate configuration or the top gate configuration as long as they employ the multi-layer configuration. This is the reason why no reference is made to the gates in the both configurations. However, it is needless to say that the gates wiring layer and the insulation film are necessarily in multi-layer configuration and are used in optimized form. Typically, indium tin oxide (ITO) is used.

Again, in the above configuration, contrast can be increased because there is no slanting of liquid crystal molecules due to protrusions or the like when no voltage is applied.

What is claimed is:

1. A liquid crystal display, comprising: an insulation film region at least one location in each pixel on one substrate of a pair of substrates of an active matrix multi-domain vertically aligned liquid crystal display in such a manner to cause electrical potential gradients in at least two directions in a liquid crystal region corresponding to the boundary area of the insulation film region by differentiating electrical potential to be applied to a certain area of a liquid crystal from that to the other areas when a voltage is applied to the liquid crystal, wherein the insulation film region comprises an aperture formed in a primary pixel electrode on the substrate that is opposed to a color filter, an insulation film that covers the aperture and parts of the primary pixel electrode adjacent to both end portions of the aperture, and a secondary pixel electrode on the insulation film and having the same width as the insulation film by disposing the insulation film between the secondary pixel electrode and the primary pixel electrode in an electrically floating configuration.

2. A liquid crystal display, comprising: an insulation film region at least one location in each pixel on one substrate of a pair of substrates of an active matrix multi-domain vertically aligned liquid crystal display in such a manner to cause electrical potential gradients in at least two directions in a liquid crystal region corresponding to the boundary area of an insulation film region by differentiating electrical potential to be applied to a certain area of a liquid crystal from that to the other areas when a voltage is applied to the liquid crystal, wherein the insulation film region comprises an aperture in a pixel electrode on the substrate that is opposed to a color filter and the insulation film that only covers the aperture and parts of the pixel electrode adjacent to both end portions of the pixel electrode adjacent to the aperture.

3. A liquid crystal display, comprising: an insulation film region at least one location in each pixel on one substrate of a pair of substrates of an active matrix multi-domain vertically aligned liquid crystal display in such a manner to cause electrical potential gradients in at least two directions in a liquid crystal region corresponding to the boundary area of the insulation film region by differentiating electrical potential to be applied to a certain area of a liquid crystal from that to the other areas when a voltage is applied to the liquid crystal, wherein the insulation film region comprises an insulation film formed on a certain area on the substrate that is opposed to a color filter and a secondary pixel electrode formed on the insulation film and dielectric constant of the insulation film is sufficiently higher or lower than that of liquid crystal molecules, and wherein the secondary pixel electrode is the same material and the same layer as either electrode of a thin film transistor.

4. A liquid crystal display of claim 1, wherein the insulation film is the same material and the same layer as the insulation film of the thin film transistor.

5. A liquid crystal display of claim 1, wherein the insulation film is the same material and the same layer as the insulation film between the pixel electrode and the drain or the source of the thin film transistor.

6. A liquid crystal display of claim 1, wherein an alignment film is formed on the inner most surface of the substrate that is opposed to a color filter including the insulation film region and the primary pixel electrode region.

7. A liquid crystal display of claim 1, wherein the secondary pixel electrode is the same material and the same layer as either electrode of a thin film transistor.

8. A liquid crystal display of claim 2, wherein the insulation film is the same material and the same layer as the insulation film of the thin film transistor.

9. A liquid crystal display of claim 2, wherein the insulation film is the same material and the same layer as the insulation film between the pixel electrode and the drain or the source of the thin film transistor.

10. A liquid crystal display of claim 2, wherein an alignment film is formed on the inner most surface of the substrate that is opposed to a color filter including the insulation film region and the primary pixel electrode region.

* * * * *